United States Patent [19]

Arvidsson et al.

[11] Patent Number: 5,104,020
[45] Date of Patent: Apr. 14, 1992

[54] APPARATUS FOR CARRYING A LOAD

[75] Inventors: Jan-Ivar Arvidsson; Willis Thulin, Hillerstorp, both of Sweden

[73] Assignee: Industri AB Thule, Hillerstorp, Sweden

[21] Appl. No.: 487,965

[22] PCT Filed: Nov. 16, 1988

[86] PCT No.: PCT/SE88/00616
§ 371 Date: May 14, 1990
§ 102(e) Date: May 14, 1990

[87] PCT Pub. No.: WO89/04775
PCT Pub. Date: Jun. 1, 1989

[30] Foreign Application Priority Data

Nov. 24, 1987 [SE] Sweden .................................. 8704646

[51] Int. Cl.$^5$ .............................................. B60R 9/00
[52] U.S. Cl. ...................... 224/331; 224/322; 224/329
[58] Field of Search ................ 224/309, 322, 323, 324, 224/325, 328, 329, 330, 331, 326

[56] References Cited

U.S. PATENT DOCUMENTS

| 3,104,042 | 9/1963 | Gaus | 224/330 X |
| 3,899,111 | 8/1975 | Binding et al. | 224/331 X |
| 4,688,706 | 8/1987 | Thulin | 224/329 |
| 4,877,169 | 10/1989 | Grim | 224/331 |

FOREIGN PATENT DOCUMENTS

| 200939 | 12/1958 | Austria | 224/331 |
| 765679 | 8/1967 | Canada | 224/331 |
| 2559110 | 8/1985 | France | 224/326 |
| 8502268 | 3/1987 | Netherlands | 224/326 |

Primary Examiner—Ernest G. Cusick
Assistant Examiner—Glenn T. Barrett
Attorney, Agent, or Firm—Burns, Doane, Swecker & Mathis

[57] ABSTRACT

A load carrier for a vehicle is provided with a strut (1) disposed transversely over the roof (6) of the vehicle, and with a foot member (2) in each end. The foot members are provided with a support member (3) and a gripping member (4) which, by way of an operating device (20, 21), are mountable against edge portions (5, 6) of the vehicle roof, for fixedly securing the load carrier. In order to render such fixed securement extra reliable, both the support member (3) and the gripping member (4) are disposed on a pivotal arm (17) which, by way of a pivot (16), is fixedly secured in an upper portion of the foot member (2). The arm (17) is pivotal with its lower portion in towards the center of the vehicle so that both the under gripping portion (19) of the gripping member (4) and the support member (3) accompany the arm in this movement. At the same time, the gripping member (4) is slidable along a sliding surface (18) on the arm (17) in a direction upwardly and inwardly for displacement of the gripping portion (19) towards the support member (3). Both the movement of the arm (17) and the sliding movement of the gripping member (4) are realized by the operating device (20, 21).

17 Claims, 4 Drawing Sheets

APPARATUS FOR CARRYING A LOAD

TECHNICAL FIELD

The present invention relates to an apparatus for carrying a load on a vehicle, with a strut extending over the roof of the vehicle, and with feet disposed in the regions at the opposing sides of the vehicle for securement on the vehicle, the foot at least on the one side of the vehicle including a support member for abutment against the vehicle and a gripping member which, under the action of an operating device, is movable in relation to the support member for fixedly securing the foot on the vehicle.

BACKGROUND ART

Load carriers, or 'roof racks' for vehicles, of the type intimated by way of introduction are known in many different variations. One prior art type of such a load carrier is provided with a fixed support foot which is intended to be placed in the guttering on a vehicle. In order to retain the support foot in the guttering, use is made of a gripping member with a catch-shaped portion which grips in under the guttering as good as straight from beneath.

On such cars as lack the above-mentioned, conventional guttering, this anchorage method will not function and, in order also to provide the possibility in such cases of fixing a load carrier to the vehicle, support portions have been employed in the form of plates with protective coatings of rubber which abut against an edge portion of the upper side of the roof, often at the door openings in the bodywork. Also in this case, the gripping member is catch-shaped and extends into the door opening in order to grasp about the upper edge portion of the bodywork. However, the geometry in the bodywork of modern cars is, because of far-reaching demands for streamlining and reduction of air-resistance, configurated in such a manner that neither will this method of fixedly securing a load carrier provide sufficient dependability. Conditions become particularly troublesome when that surface against which the gripping member abuts displays a marked slope from the side of the vehicle downwardly and inwardly towards the centre of the vehicle. If, in addition, the outer contour of the roof adjacent the door opening makes approximately a right angle with the upper defining surface in the door opening, i.e. that surface on the bodywork against which the gripping member is to abut, it will be readily perceived that just a pull upwards, or at right angles to the abutment surface of the gripping member against the bodywork will have dire consequences.

An additional factor which impedes fixed securement of the load carrier is that, on loading of the load carrier, the rod or strut of the carrier extending transversely across the vehicle roof will be bent downwardly at its central region, so that thereby the feet will 'splay out' from one another, whereby the engagement with the edge portions of the vehicle bodywork will be weakened.

Certain modern bodywork types still retain projections which have approximately the same location and function as the guttering on older models of bodywork. However, these projections are placed in behind a fully-covering vehicle door so that the projections are accessible in their entirety only when the door is open but, when the door is closed, are merely accessible through an extremely narrow slit-shaped and upwardly facing opening between the door edge proper and adjacent portions of the bodywork. In bodywork models of this type, it must be possible to place the load carrier with such accurate precision in the narrow slit-shaped opening between the edge of the door and the bodywork that damage to both the bodywork and the door is wholly avoided or eliminated. Furthermore, these precision requirements are, in particular when the load carrier is placed under a load, naturally difficult to achieve in a bodywork model of this type because of the extremely limited space.

OBJECTS OF THE INVENTION

The object of the present invention is to realise an apparatus of the type mentioned by way of introduction, the apparatus being designed to obviate the above-considered problems and drawbacks inherent in prior art constructions. Thus, the present invention has for its object to realise an apparatus which permits efficient and reliable anchorage, even in extreme loading of the load carrier, almost totally irrespective of the bodywork design which may come into question. In particular, the present invention has for its object to devise an apparatus whose fixed retention on the vehicle bodywork is not appreciably influenced by the deformations of the load carrier caused by the load. The present invention further has for its object to realise an apparatus which is flexible so that it may readily be adapted or adjusted to a specific bodywork type.

SOLUTION

The objects forming the basis of the present invention will be attained if the apparatus intimated by way of introduction is characterised in that both the support member and the gripping member are movably accommodated in the foot member, in such a manner that they are, with their lower portions intended for cooperation with the vehicle, movable towards a longitudinal centre line of the vehicle.

According to one preferred embodiment of the apparatus according to the present invention, the operating device is suitably common to both the support member and the gripping member, and the operating device is disposed for realising both the relative movement between the support member and the gripping member, and their movement towards the centre line of the vehicle.

According one practical embodiment, it further suitably applies according to the present invention that the foot member is provided with a pivotally fixed part which, with a lower portion, is movable towards and away from the centre line of the vehicle, that both the support member and the gripping member are pivotally disposed together with this part, and that, in addition, the gripping member is vertically displaceable along this part.

Further advantages will be attained according to the present invention if the subject matter as disclosed herein is also given one or more of the characterising features as set forth in appended claims 4-6.

BRIEF DESCRIPTION OF THE ACCOMPANYING DRAWINGS

The nature of the present invention and its aspects will be more readily understood from the following brief description of the accompanying Drawings, and discussion relating thereto.

DESCRIPTION OF PREFERRED EMBODIMENT

Figure 1:
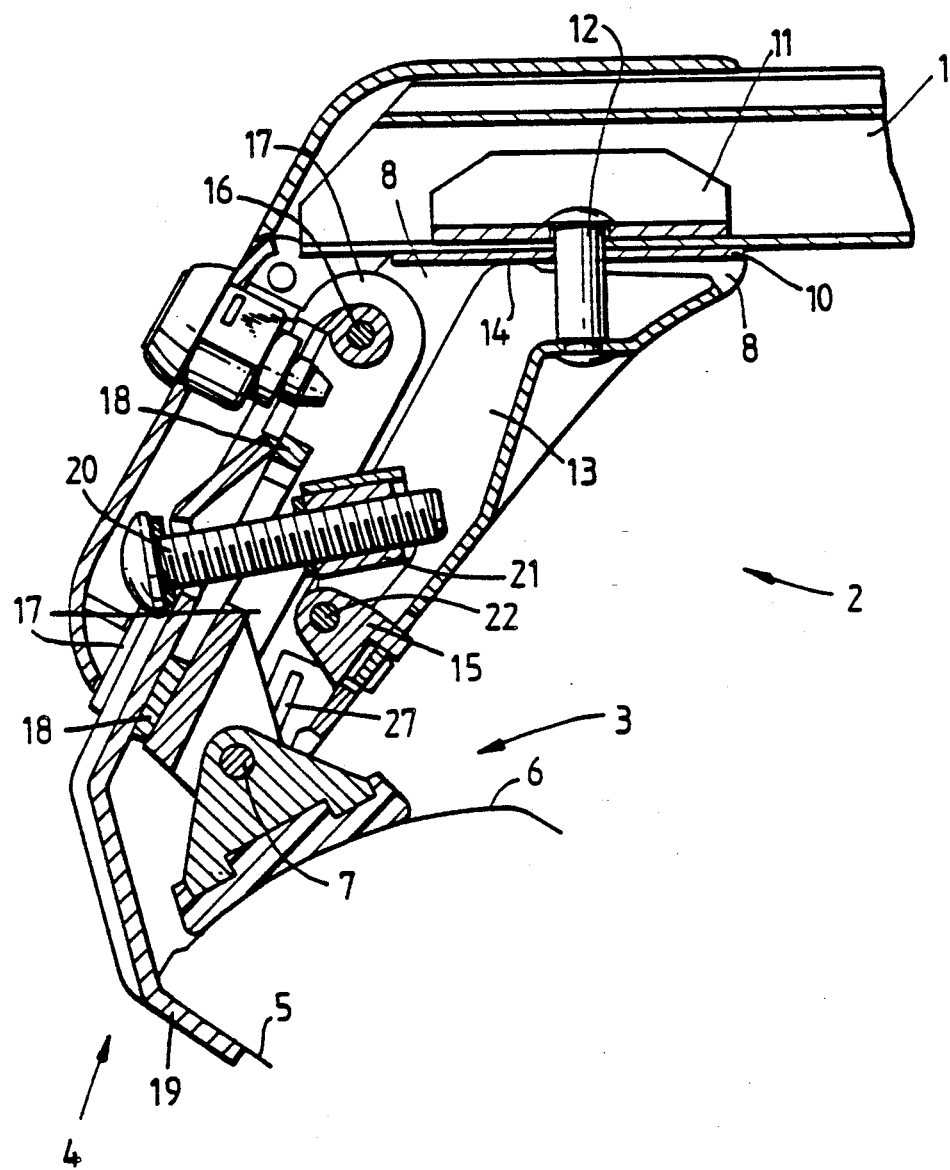
FIG. 1 is a vertical section through a foot member included in the apparatus according to the present invention, the section lying transversely of the longitudinal axis of the vehicle.

Referring to the Drawings, the load carrier, or roof rack, according to the present invention includes a load carrying strut 1 extending transversely over the roof of the vehicle, the strut being secured in a foot member 2 which, in its lower end, is provided with a support member 3 and a gripping member 4, the essential purpose of the support member being to bear from above against the vehicle bodywork, while the purpose of the gripping member is to grasp about a suitably projecting portion of the vehicle bodywork so that thereby the support member is urged thereagainst. In FIG. 1, that surface 5 against which the gripping member 4 abuts with a catch portion 19 constitutes, for example, an upper defining surface of a door opening in the vehicle body, and this surface slopes steeply down in a direction in towards the centre line of the vehicle. The outer contour of the roof has an outer surface 6 against which the support member abuts, and in the embodiment illustrated here, the outer surface 6 makes roughly a right angle with the inner surface 5, at least in the corner region immediately above the door opening. Suitably, the support member 3 is, in a conventional manner, pivotally secured in the foot member 2 by means of a pivot shaft 7 so that it may adjust to the true slope of the outer surface 6. Furthermore, the gripping member 4 is suitably specifically designed for the bodywork model which is applicable in each individual case, whereby the gripping member is designed in such a manner that it may suitably be replaced without the necessity of effecting any other modifications to the foot member 2.

The foot member 2 is provided with a body portion with forward and rear defining portions 8 and 9, these being connected at the top to an upper portion 10 which serves to carry and fixedly retain the strut 1. To this end, the upper portion 10 is provided with a through aperture and the lower defining wall of the strut 1 with a longitudinal slit so that a pressure plate 11 may be placed interiorly in the strut, the pressure plate being connected, by the intermediary of a pull rod 12, to a tightening mechanism interiorly in the foot member 2.

The tightening mechanism includes an angled arm 13 which is pivotal or rockable in relation to the body portion 8-10 of the foot member and is provided with an upper cam surface 14 in abutment against the underside of the upper portion 10 in the body portion. On pivoting of the angled arm 13 clockwise about the point of abutment between the cam surface 14 and the upper portion 10, the pull rod or pin 12 will be drawn downwardly and, thereby, will, by the intermediary of the pressure plate 11, urge the strut 1 into hard and positionally fixing abutment against the upper side of the body portion 8-10. On pivoting in the opposite direction, the strut 1 will, naturally be released so that it may be removed from the foot member.

To permit a permanent setting of the load carrier to a particular vehicle type, the angled arm 13 is lockable in a position in which the strut 1 is fixedly retained in the foot member 2, in that the angled arm 13 is provided with a pivotal locking catch 15 which is shown in FIG. 1 in the locking position in engagement with the two defining portions 8 and 9 in the connecting portion of the foot member. On pivoting of the locking catch 15 counterclockwise in FIG. 1, the engagement of the locking catch with the defining portion 8 will be released whereby the angled arm 13 is, under certain conditions, free to be pivoted in a counterclockwise direction releasing the strut 1.

Furthermore, a pivotal portion 17 is pivotally anchored in both the defining portions 8 and 9 in the foot member 2 by the intermediary of a pivot shaft 16, the pivotal portion being elongate in the vertical direction of the foot member 2 and being pivotal such that its lower end may be displaced in a direction in towards and out away from the longitudinal centre line of the vehicle.

A suitable anchorage is disposed in the lower end of the pivotal portion 17 for that pivot shaft 7 which carries the support member 3. Furthermore, the pivotal portion 17 is provided with a sliding portion 18 against whose side facing away from the centre line of the vehicle the gripping member 4 slidingly abuts. Hereby, both the support member 3 and the gripping member 4 may be pivoted together with the pivotal portion 17 and execute a common movement in towards the longitudinal centre line of the vehicle. Since, moreover, the gripping member 4 is slidable along the sliding portion 18 on the pivotal portion 17 substantially in the longitudinal direction thereof, i.e. in the vertical direction in the foot member, it will also be readily appreciated that the lower catch portion 19 of the gripping member 4 can be displaced towards and away from the support member 3 so that both of these parts may together grip and clamp about the corner portion between the inner surface 5 of the bodywork and its outer surface 6.

By the pivoting of the pivotal portion 17 with its lower end in towards the longitudinal centre line of the vehicle, there will be realised further urging abutment of the support member 3 and the gripping member 4 against the bodywork surfaces in question, and this urging abutment provides good tensioning in the longitudinal direction of the strut 1 in the anchorage of the load carrier on the vehicle body.

According to the present invention, the support member 3 and the gripping member 4 are preferably provided with a common operating device which is designed in such a manner that it first realises a displacement of the gripping member 4 substantially upwardly along the sliding portion 18 of the pivotal portion 17, so that, hereby, the catch portion 19 approaches the support member 3. The operating device is further designed in such a manner that, during the final phase of its operative period, it will occasion pivoting of the pivotal portion 17 in a direction in towards the longitudinal centre line of the vehicle, so that, hereby, the support member 3 and the gripping member 4 undergo relatively short (5-10 mm) displacement movement in towards the longitudinal centre line of the vehicle.

The operating device includes a tightening member or screw 20 which extends through an aperture in that part of the gripping member 4 which is located in cooperation with the sliding portion 18 of the pivotal portion 17. The tightening member 20 further extends through an aperture in the pivotal portion and is accommodated with a threaded portion in a nut 21 which serves the function of a counter member on tightening of the screw 20. The nut 21 is pivotally connected to the angled arm 13 in such a manner that its pivotal axis is disposed a distance beneath the longitudinal axis of the screw 20. The retention and pivoting shaft of the nut 21 in the angled arm 13 is designated 22 in the Drawing and may be common to both the nut 21 and the locking catch 15.

As a result of the pivotal location of the nut 21 a slight distance above its retention shaft 22, the tightening direction of the screw 20 will vary somewhat during the tightening process. However, the tightening direction will, throughout the entire tightening process, be directed in towards that point above the vehicle roof at the longitudinal centre line of the vehicle.

At the beginning of the tightening process of the screw, the screw will be 'more longitudinally directed' in relation to the sliding portion 18 than is the case during later phases of the tightening process. Hereby, the screw 20 will, during the beginning of its tightening process, impart greater force to the gripping member 4 in the displacement direction thereof along the sliding portion 18 than is the case during the final phase of the tightening process when the tightening direction becomes 'more transversely directed' towards the sliding portion 18 so that hereby the gripping member 4 will be urged harder thereagainst, while the vertical movement of the gripping member is reduced at the same time as pivoting of the pivotal portion 17 is increased.

DESCRIPTION OF ALTERNATIVE EMBODIMENTS

Figure 2:
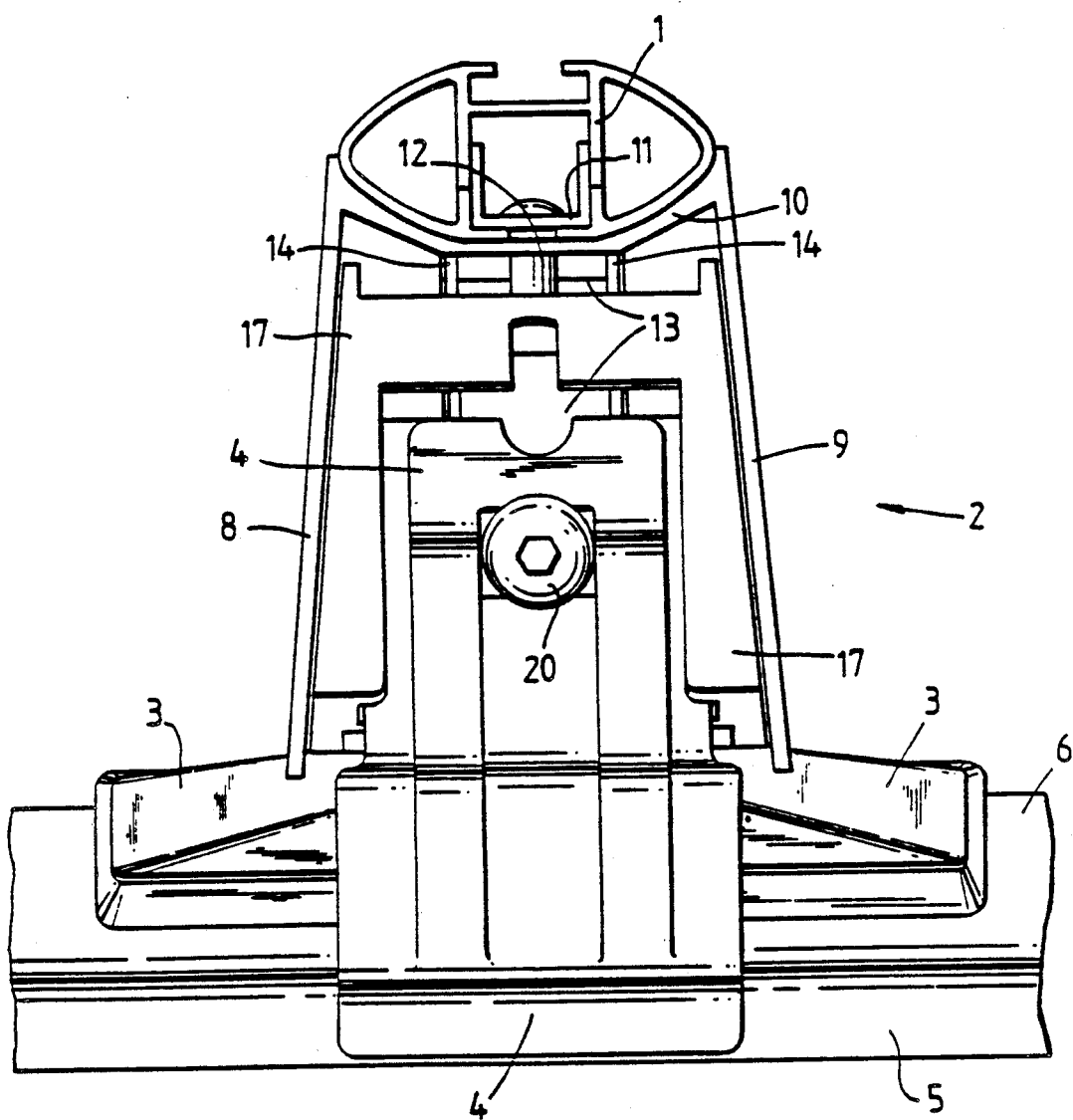
FIG. 2 shows the foot member of FIG. 1 seen in the longitudinal direction of the transverse strut and with certain protective caps dismounted.
Figure 3:
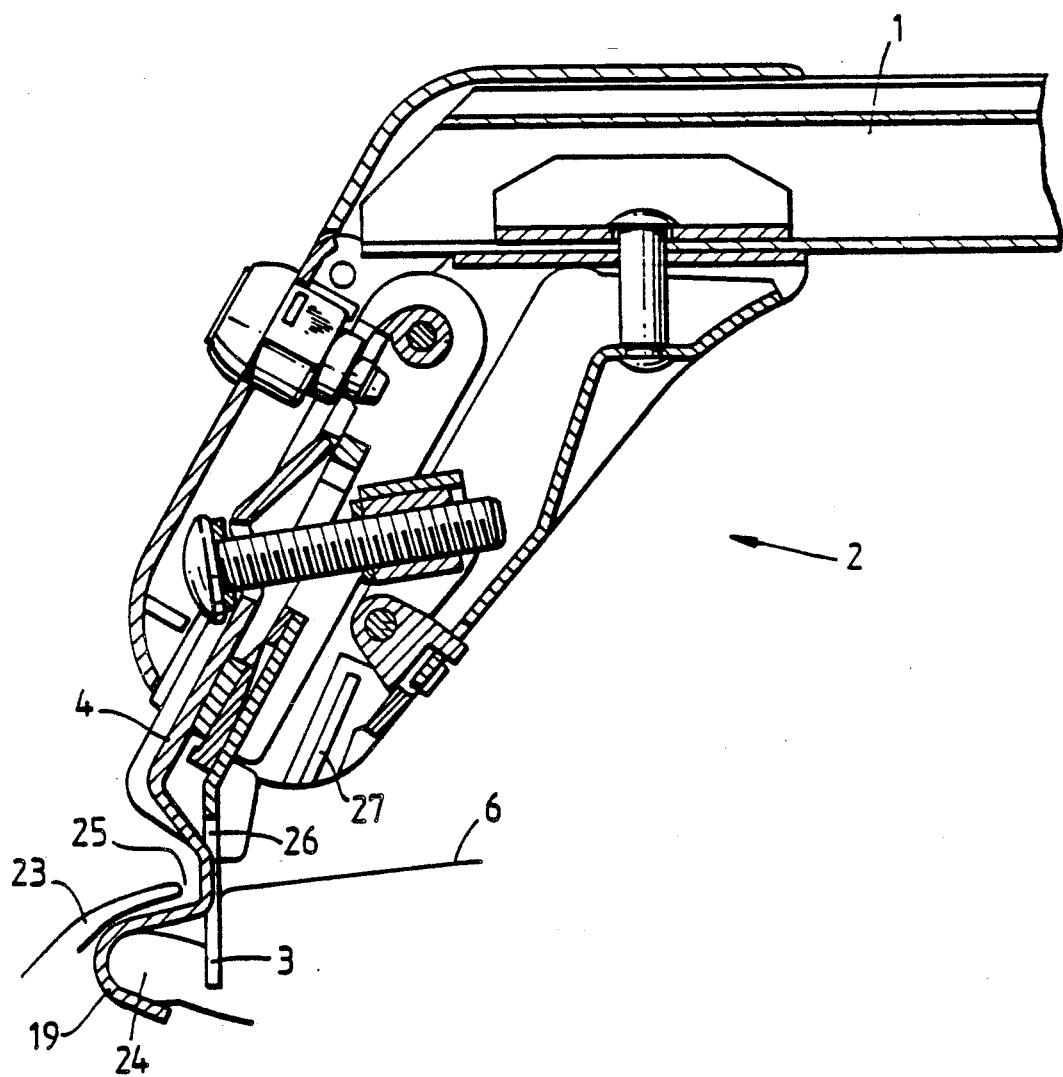
FIG. 3 is a cross-section corresponding to the cross-section according to FIG. 1, this embodiment being, however, slightly modified in respect of the support member and gripping member.
Figure 4:
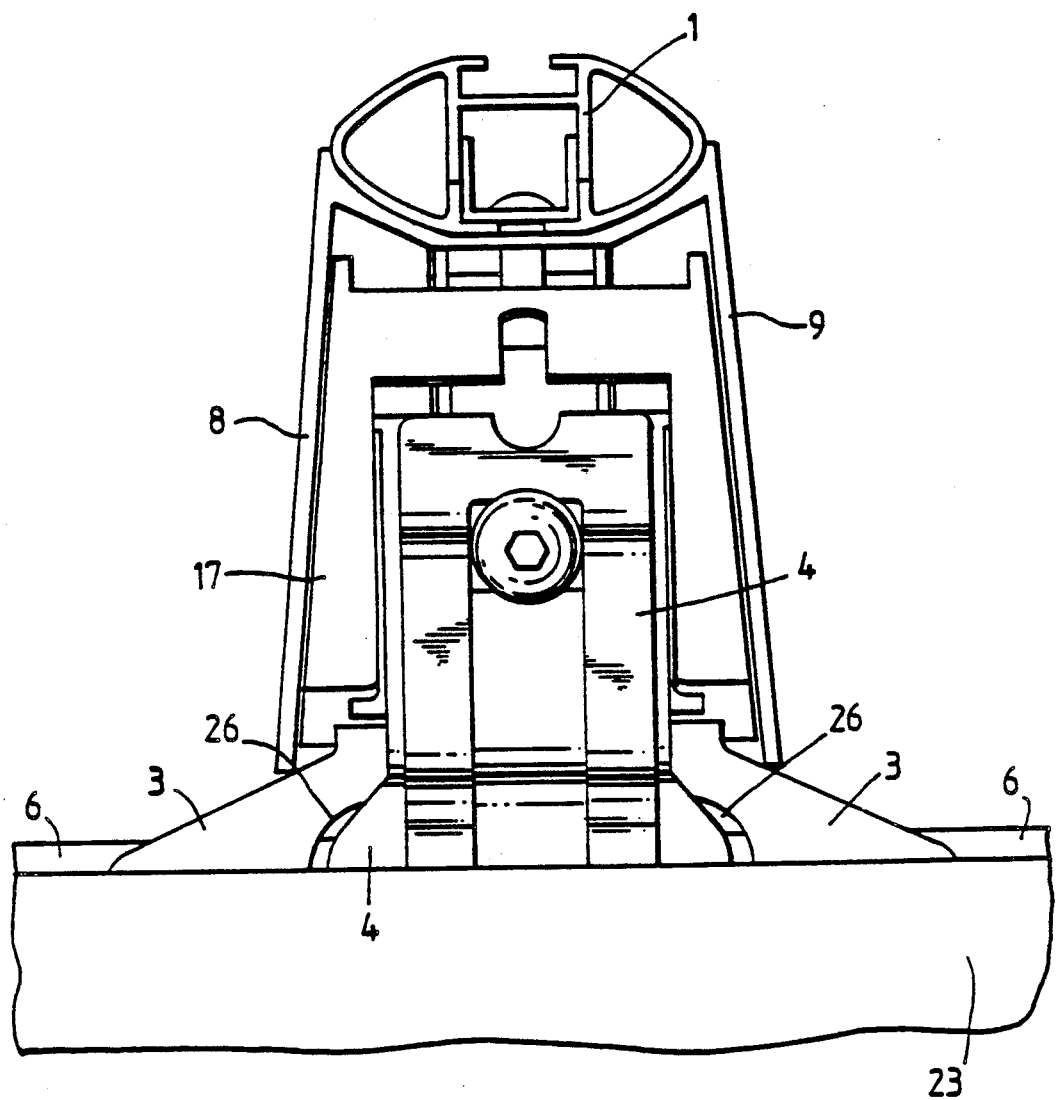
FIG. 4 is a view corresponding to that of FIG. 2 of the embodiment according to FIG. 3.

In principle, the embodiment of the apparatus according to the present invention shown in FIGS. 3 and 4 differs from the embodiment of FIGS. 1 and 2 only by a differing design of the support member 3 and the gripping member 4. In this embodiment, the load carrier is intended for a vehicle body type in which there is provided, in behind the upper edge of the door on the body proper, a laterally displaceable projection 24 which may have the function of rigidifying the body, which may serve for anchorage of a sealing strip, or which may possibly function as a roof guttering.

In a body model of this type, there is formed, between the upper edge of the door and the adjacent portion of the outside surface 6 of the roof, but a narrow slit-shaped opening 25. In the embodiment under consideration here, the support member 3 is, therefore, designed as a plate which is elongate in the longitudinal direction of the vehicle and which extends down through the slit-shaped opening 25 between the door 23 and the roof surface 6. The under edge of this elongate support member 3—which is narrow in the transverse direction of the vehicle—is designed to abut against the upper side of the projection 24.

Correspondingly, the lower portion of the gripping member 4 is designed in such a manner as to extend into a recess 26 in the central region of the support member 3, in order to pass down through the slit-shaped opening 25 and to be able to grip, with its curved gripping portion 19, about a lower portion or edge portion on the projection 24.

Also in this embodiment, both the support member 3 and the gripping member 4 are readily replaceable in the foot member, since these details must, as a rule, be specifically adapted to suit the body model in question.

According to the present invention, both of the foot members 2 need not be of identical design, it being sufficient if one of the foot members has an operating device, a pivotal portion 17 and the remaining moving parts. The opposing foot member may, therefore, lack such moving parts as are required for the actual fixed retention, but of course, the support member 3 and gripping member 4 should be readily replaceable in this foot member as well. In a foot member designed in this manner, the strut 1 may naturally have permanent, non-openable anchorage in the foot member.

According to the present invention, it should also be possible to employ an operating device with two different tightening members in which the one tightening member caters for pivoting of the pivotal portion 17, while the other caters for the relative movement between the gripping member 4 and the support member 3—in practice the movement between the gripping member 4 and the pivotal portion 17.

According to the present invention, anchorage of the strut 1 in the foot member may be effected in a plurality of different ways, such that the angled arm 13 and the moving parts connected thereto could possibly be dispensed with. A conventional screw union between the strut and the foot member could here realise the anchorage of the strut. In such an embodiment, the tightening device or counter members or nuts of the tightening device may suitably be pivotally secured as described above with their pivot shafts disposed directly in the foot member, possibly in the two defining portions 8 and 9 thereof.

In certain cases, it may also be advantageous if the gripping member 4 is not excessively positively guided under the action of the screw and the sliding portion 18 of the pivotal portion 17. To permit adaptation of the direction of the gripping member 4 in relation to the body of the vehicle proper, the gripping member may have slightly arched or punctuate abutment surfaces against the sliding portion 18. Alternatively, this may, of course, also be designed in a corresponding manner while the gripping member is substantially planar on its side facing the sliding portion. Thus, in some cases, a certain possibility for a rocking movement or pivotal movement about the approximately vertically directed longitudinal axis of the gripping member may be an advantage. To allow for this, the screw 20 should naturally extend through the central region of the gripping member seen in the longitudinal direction of the vehicle.

The foot member as illustrated in FIGS. 1 and 3 has, in a lower region of the fixed body portion, grooves 27 in the opposing defining portions 8 and 9. These grooves are intended for mounting different types of accessories. For example, in certain designs of the vehicle roof, the above-described mobility of the support member 3 may be superfluous. In order, in such a case, to increase the flexibility of the apparatus according to the present invention, an immobile support member may be mounted in these grooves 27.

The present invention should not be considered as restricted to that described in the foregoing and shown on the Drawings, many modifications being conceivable without departing from the spirit and scope of the appended claims.

We claim:

1. An apparatus for carrying a load on a vehicle having a roof, comprising: a bar for extending over the roof; foot members for supporting the bar and for being individually positioned and mounted on opposite sides of the vehicle, at least one of said foot members being provided with a support member for abutting against the vehicle and a gripping member for gripping a portion of the vehicle; and an operating device including one tightening member, said operating device being operatively associated with the at least one foot member to move the support member and the gripping member toward and away from one another and to move the support member and the gripping member towards a longitudinal center line of the vehicle in response to operation of said one tightening member to thereby securely mount the at least one foot member in place on the vehicle.

2. The apparatus according to claim 1, wherein said at least one foot member includes a locking arm mounted for pivotal movement on a body portion of the at least one foot member for securing the bar relative to the at least one foot member, said operating device being connected to the locking arm so that upon operation of the operating device the locking member is pivoted to thereby secure the bar relative to the at least one foot member.

3. The apparatus according to claim 2, wherein said at least one foot member includes a pivoting member pivotally mounted on the body portion of the at least one foot member so that a lower portion of the pivoting member is movable towards and away from the longitudinal axis of the vehicle when the at least one foot member is mounted on the vehicle, said support member and said gripping member being coupled to said pivoting member so as to pivot with the pivoting member.

4. The apparatus according to claim 3, wherein said gripping member is slidably coupled to the lower portion of the pivoting member and said support member is pivotally coupled to the lower portion of the pivoting member.

5. The apparatus according to claim 4, wherein said support member is pivotally coupled to the lower portion of the pivoting member by way of a first pivot shaft, said first pivot shaft having an axis that is substantially parallel to the longitudinal center line of the vehicle when the at least one foot member is mounted on the vehicle.

6. The apparatus according to claim 3, wherein said operating device includes a tightening member that extends through apertures formed in the gripping member and the pivoting member, said tightening member having a longitudinal axis that is directed towards a point above a mid area of the vehicle roof when the at least one foot member is mounted on the vehicle, said pivoting member being pivotally connected to the body portion of the at least one foot member by way of a second pivot shaft, said tightening member being positioned below the second pivot shaft.

7. The apparatus according to claim 6, wherein said tightening member threadably engages a counter member, said counter member being pivotally mounted on the locking arm by way of a retention shaft, said retention shaft being spaced apart from said tightening member and said retention shaft having a longitudinal axis that extends in the direction of the longitudinal center line of the vehicle when the at least one foot member is mounted on the vehicle.

8. An apparatus for carrying a load on a vehicle having a roof, comprising: a bar for extending over the roof; foot members for supporting the bar and for being individually positioned and mounted on opposite sides of the vehicle, at least one of said foot members including a pivoting member pivotally mounted on a body portion of the at least one foot member so that a lower portion of the pivoting member is movable towards and away from a longitudinal center line of the vehicle when the at least one foot member is mounted on the vehicle; a support member coupled to said pivoting member for abutting against the vehicle and a gripping member coupled to said pivoting member for gripping a portion of the vehicle, said support member and said gripping member being coupled to said pivoting member so that pivoting movement of the pivoting member results in movement of the support member and the gripping member, said at least one foot member including an operating device operatively associated with the pivoting member for causing the support member and the gripping member to move toward and away from one another and to move towards the longitudinal center line of the vehicle when the at least one foot member is mounted on the vehicle.

9. The apparatus according to claim 8, wherein said gripping member is slidably coupled to the pivoting member and said support member is pivotally coupled to the pivoting member.

10. The apparatus according to claim 9, wherein said pivoting member is provided with a sliding portion along which the gripping member slides during initial operation of the operating device to mount the at least one foot member on the vehicle.

11. The apparatus according to claim 9, wherein said operating device extends through an aperture in the gripping member and through an aperture in the pivoting member.

12. The apparatus according to claim 8, including a tightening mechanism for tightening the at least one foot member relative to the bar, said tightening mechanism including an angled arm mounted for pivotal movement relative to the body portion by way of a pull rod that extends through an aperture in the angled arm, through an aperture in the body portion of the at least one foot member, through an aperture in the bar and through an aperture in a generally U-shaped pressure plate positioned interiorly of the bar.

13. An apparatus for supporting a load on a vehicle having a roof, comprising: a bar adapted to be positioned above the roof of the vehicle and to carry the load; two foot members for securing the bar in place above the roof, said two foot members being adapted to be individually positioned and securely mounted on opposite sides of the vehicle, at least one of said foot members including a pivoting member pivotally mounted to a body portion of the at least one foot member; a gripping member coupled to said pivoting member and adapted to grip a portion of the vehicle; a support member coupled to said pivoting member and adapted to abut against the vehicle; and means for securing the at least one foot member on the vehicle by causing the gripping member and the support member to concurrently move towards the oppositely positioned support member.

14. The apparatus according to claim 13, wherein said support member is pivotally coupled to the pivoting member.

15. The apparatus according to claim 14, wherein the gripping member is slidably coupled to the pivoting member.

16. The apparatus according to claim 14, wherein said means for securing the at least one foot member on the vehicle includes a tightening member that extends through an aperture in the gripping member and through an aperture in the pivoting member.

17. The apparatus according to claim 16, including an angled arm coupled to a body portion of the at least one foot member to permit the angled arm to pivot for securing the at least one foot member to the bar, said tightening member being threadably engaged with a coupling member, said coupling member being pivotally mounted on the angled arm.

* * * * *